United States Patent [19]
Behrens

[11] Patent Number: 5,628,371
[45] Date of Patent: May 13, 1997

[54] ELEVATING SYSTEM FOR FARM IMPLEMENTS

[76] Inventor: Harry Behrens, R.R. 1, Box 36, Surrey, N. Dak. 58785

[21] Appl. No.: 554,290

[22] Filed: Nov. 6, 1995

[51] Int. Cl.⁶ .................................................. B60S 9/12
[52] U.S. Cl. ............................ 172/395; 280/6 H; 172/78
[58] Field of Search ............................ 37/266, 270, 272, 37/901, 904; 172/395, 396, 397, 399, 900, 906, 908, 909; 414/495, 563, 521; 280/6 F, 6 N

[56] References Cited

U.S. PATENT DOCUMENTS

| | | |
|---|---|---|
| 1,013,740 | 1/1912 | Chandonnet . |
| 1,424,128 | 8/1922 | Ziegler . |
| 2,022,757 | 12/1935 | Buffington ............................ 37/153 |
| 2,314,041 | 3/1943 | Gurries ................................. 97/50 |
| 2,874,490 | 2/1959 | Harmon ............................ 172/397 X |
| 2,979,140 | 4/1961 | McKenzie ............................ 172/676 |
| 3,106,968 | 10/1963 | Talbent ............................ 172/395 X |
| 3,481,407 | 12/1969 | Arnold et al. ..................... 172/900 X |
| 3,793,752 | 2/1974 | Snyder ................................ 37/42 R |
| 3,913,683 | 10/1975 | Olsson et al. ..................... 172/400 X |
| 4,247,126 | 1/1981 | Claxton ............................ 172/395 X |
| 4,374,546 | 2/1983 | Mitchell ............................ 172/148 |
| 4,703,810 | 11/1987 | Meiners ............................ 172/178 |
| 4,743,059 | 5/1988 | Lequen ............................ 414/495 X |

Primary Examiner—Terry Lee Melius
Assistant Examiner—Robert Pezzuto
Attorney, Agent, or Firm—Moore & Hansen

[57] ABSTRACT

A hydraulic lift apparatus for a farm implement has a sleeve mounted to the frame of the cultivator in a substantially upright position, and a fluidic cylinder mounted atop the sleeve. A caster wheel with a shaft is fully, rotatably, and slidably received within the sleeve and cylinder. When the cylinder is actuated, the cylinder piston pushes downward on the caster shaft and forces the shaft partially out of the cylinder and sleeve, thereby raising the frame of the farm implement and the blades attached to the frame. When the farm implement is to be returned to an operating position, the pressure on the cylinder is released and gravity returns the frame to its original position. A washer and cap screw on the caster shaft interact with a shoulder in the sleeve to prevent the caster shaft from falling out of the sleeve. A guide bushing at the bottom of the sleeve interact with a stop member on the caster shaft to limit upward motion of the caster shaft. Motion between the fully retracted and fully extended positions is unobstructed.

11 Claims, 2 Drawing Sheets

5,628,371

ELEVATING SYSTEM FOR FARM IMPLEMENTS

BACKGROUND OF THE INVENTION

The present invention relates generally to the field of farm implements. Specifically, it relates to lift apparatuses for cultivators, air seeders, and the like.

Cultivators use a series of downwardly extending ground breaking blades to dig out furrows in which seeds are placed. Such blades are also present on air seeders and used to create furrows in which seeds are placed. To allow for transport of the farm implement on public or private roads, as well as for turning it around at the end of a cultivating or seeding row, the blades must be vertically adjustable to bring the blades clear of the earth.

Current versions of cultivators and air seeders have mechanical lift systems that use a wide variety of parallelogram linkages in complex mechanical systems. These linkages and systems significantly increase the manufacturing costs of the cultivators and air seeders, and the elaborate systems and large numbers of moving parts of these lift systems also increase maintenance costs.

Other systems known in the art use a hydraulic cylinder to raise or lower a farm implement. Most systems of this type utilize a caster wheel at the end of the hydraulic cylinder piston. The constant jarring and rotational movement of the hydraulic shaft causes continued abrasion and wear on the piston shaft, cylinder wall, and its seals, causing leakage and premature failure of the device. U.S. Pat. No. 2,979,140 to McKenzie teaches the use of a cylinder and caster shaft coaxial with, but separate from the hydraulic piston shaft. McKenzie, however, does not allow unrestrained vertical adjustment of the blade position. McKenzie severely constrains movement of the caster shaft unless the operator manually adjusts a nut to allow each such movement. Movement of the shaft is so severely restrained in McKenzie as to make its teaching useless for achieving the immediate elevating action needed to allow road travel of an implement like that described.

It would be desirable for a cultivator or air seeder to be freely adjustable from a normal operating position to an elevated transport position without the need for a physical manual adjustment by the operator of the cultivator or air seeder. It would further be desirable to provide a cultivator or air seeder that eliminates the need for complex parallelogram linkages, and which allows adjustment of blade position while the implement is in operation.

BRIEF SUMMARY OF THE INVENTION

The present invention provides a hydraulic lift apparatus for a farm implement such as a cultivator or air seeder that eliminates the need for complex linkages to raise and lower the tool carried by the implement, such as plowshares or blades. Further, the present invention provides a free floating rotatable caster shaft, separate from the hydraulic cylinder piston, capable of allowing the raising and lowering of blades without the need for manual adjustment. The invention comprises a sleeve mounted substantially upright to the frame of a farm implement. A hydraulic cylinder including a free floating cylinder piston is mounted coaxially with and at the top of the sleeve. The connection between the sleeve and the hydraulic cylinder has an inwardly extending flange.

A caster shaft mounted to a caster wheel is slidably and rotatably mounted within the sleeve and hydraulic cylinder. A washer and cap screw are affixed at the top of the caster shaft. The cylinder piston is positioned within the cylinder above the top of the caster shaft. When the cylinder is actuated, the piston pushes downward on the washer, forcing the shaft out of the cylinder and sleeve. The inwardly extending flange at the connection point between the sleeve and the hydraulic cylinder narrows the inner diameter of the sleeve and cylinder combination to a dimension less than that of the washer, thereby limiting the downward motion of the caster shaft. The caster shaft is therefore retained within the sleeve. The lower end of the sleeve has a bushing that serves as a stop for the upward travel of the caster shaft.

The hydraulic cylinder of the invention is coaxially mounted with the substantially upright shaft of the caster wheel. When the hydraulic cylinder is actuated, the piston is urged downwardly against the washer, forcing the wheel downwardly relative to the frame of the cultivator or air seeder, and therefore forcing the frame of the air seeder upward relative to the ground, elevating the carried tool such as plowshares or blades to a position in which it is no longer in contact with the ground. With the tool in this elevated position, the farm implement may be towed on a road or moved in the field without the blades or shares of the tool contacting the ground, and without the need for the operator to physically adjust the blade positioning. The adjustment is made by simply actuating the hydraulic cylinder. Since the cylinder piston is separate from the caster shaft, the constant force and wear from twisting and rotating of cylinder shafts not separate from the caster shaft is considerably reduced.

When the farm implement is to be returned to the position in which the blades are in contact with the ground, the pressure on the hydraulic cylinder is released. The weight of the cultivator or air seeder will be sufficient to force the hydraulic fluid out of the cylinder, and the blades will return to their lower, ground contacting position by the force of gravity. Because of this configuration, the hydraulic cylinder needs only to be a one way cylinder.

These and other objects and benefits of the present invention will become apparent from the following detailed description thereof taken in conjunction with the accompanying drawings, wherein like reference numerals designate like elements throughout the several views.

DESCRIPTION OF THE DRAWINGS

FIG. 4 is an enlarged section view of the washer and cap screw configuration of the embodiment of FIG. 3.

DESCRIPTION OF THE PREFERRED EMBODIMENT

Figure 1:
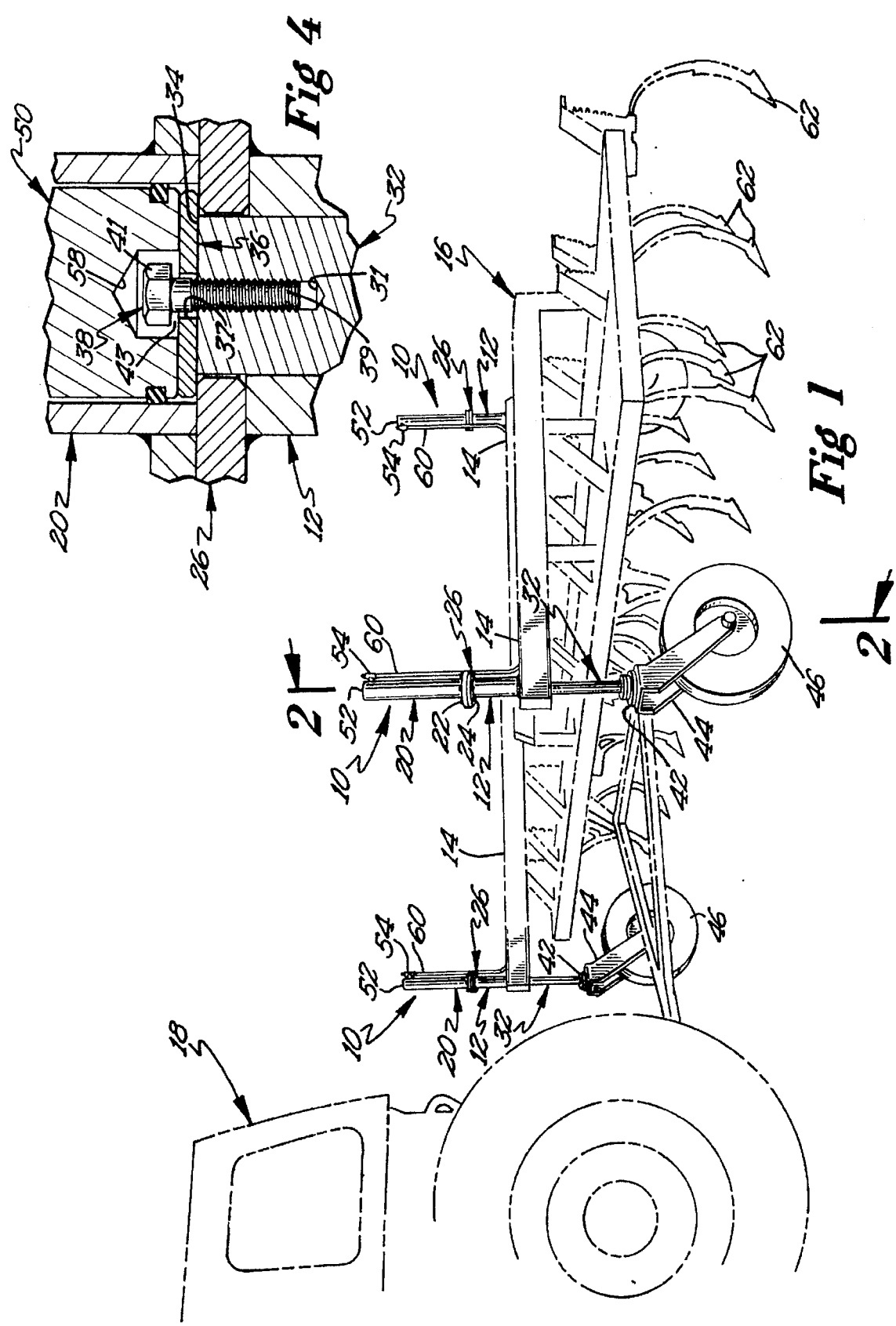
FIG. 1 is a perspective view of an embodiment of the hydraulic lift apparatus in place on a farm implement, and showing the lift apparatus in its elevated position.

Referring now to the drawings, an embodiment 10 of the lift apparatus is mounted substantially upright to the frame 14 of a farm implement such as cultivator 16. Cultivator 16 is typically towed behind a tractor 18 with the tractor having a hydraulic power system to energize various hydraulic accessories. Cultivator 16 carries a tool such as plowshares or blades 62. The lift apparatus 10 includes a stationary sleeve 12 having a longitudinal axis 13, the sleeve 12 fixed in a substantially upright position to frame 14, and a fluidically actuated cylinder such as hydraulic cylinder 20 mounted with its longitudinal axis 33 coaxial with the axis 13 of sleeve 12 by attaching means such as bolts and nuts 22 and 24 or other suitable means known to the art. Cylinder 20 may be any type of fluidically actuated cylinder, such as a pneumatic cylinder, but a hydraulic cylinder is preferred since tractors generally have a hydraulic power system built into them.

At the intersection between sleeve 12 and cylinder 20, sleeve 12 has an inwardly extending flange 26 having a shoulder 27. The inner diameter 28 of sleeve 12 just exceeds in size the outer diameter 30 of caster shaft 32. The inner diameter 29 of cylinder 20 exceeds the diameter 30 of shaft 32, allowing shaft 32 to fully, rotatably, and slidably fit into sleeve 12 and cylinder 20 without scoring of the shaft 32 or the inner walls of the cylinder 20. Flange 26 with its shoulder 27, and guide bushing 48, located at the bottom of sleeve 12, help to maintain the caster shaft 32 in position so that it will not contact the inner walls of cylinder 20.

At its top 34, easter shaft 32 is fitted with a washer 36 and a cap screw 38. The diameter of the washer 36 is smaller than the inner diameter 29 of the cylinder 20, and larger than the connection point inner diameter 28, so that when the shaft 32 is forced downward by hydraulic fluid pressure on the cylinder piston 50 to its elevated position shown in FIG. 1, the washer 36 and cap screw 38 retain the shaft 32 within the cylinder 20 and sleeve 12. Washer 36 is mounted at the top 34 of easter shaft 32 as follows. Caster shaft 32 has a threaded aperture 31 at its top 34, extending downwardly into easter shaft 32. Cap screw 38 has threaded shaft 39 that fits threaded aperture 31, and head 41. Aperture 31 is designed to receive the shaft 39 of cap screw 38 and allow shaft 39 to fully thread into aperture 31 and lock when the top thread of shaft 39 reaches the entrance of the aperture 31. In this configuration, shown in FIG. 4, a portion of aperture 31 remains untitled by shaft 39. Alternatively, aperture 31 could be threaded to its base, and shaft 39 of cap screw 38 could be threaded into the aperture all the way to its base. Thus, a gap 43 of approximately one-sixteenth inch exists between the washer 36 and head 41 of cap screw 38 when cap screw 38 is fully seated in aperture 31. Washer 36 is of a diameter slightly smaller than the inner diameter 29 of the cylinder 20, so as to allow washer 36 to float or move side to side to prevent scoring of the inner walls of cylinder 20 during normal operation. Interior opening 37 of washer 36 is slightly larger than the diameter of aperture 31 and threaded shaft 39 of cap screw 38. The configuration of washer 36 allow it to be freely rotatable and able to move from side to side without scoring the inner walls of cylinder 20 when caster shaft 32 rotates and moves side to side during normal operation.

Figures 2, 3:
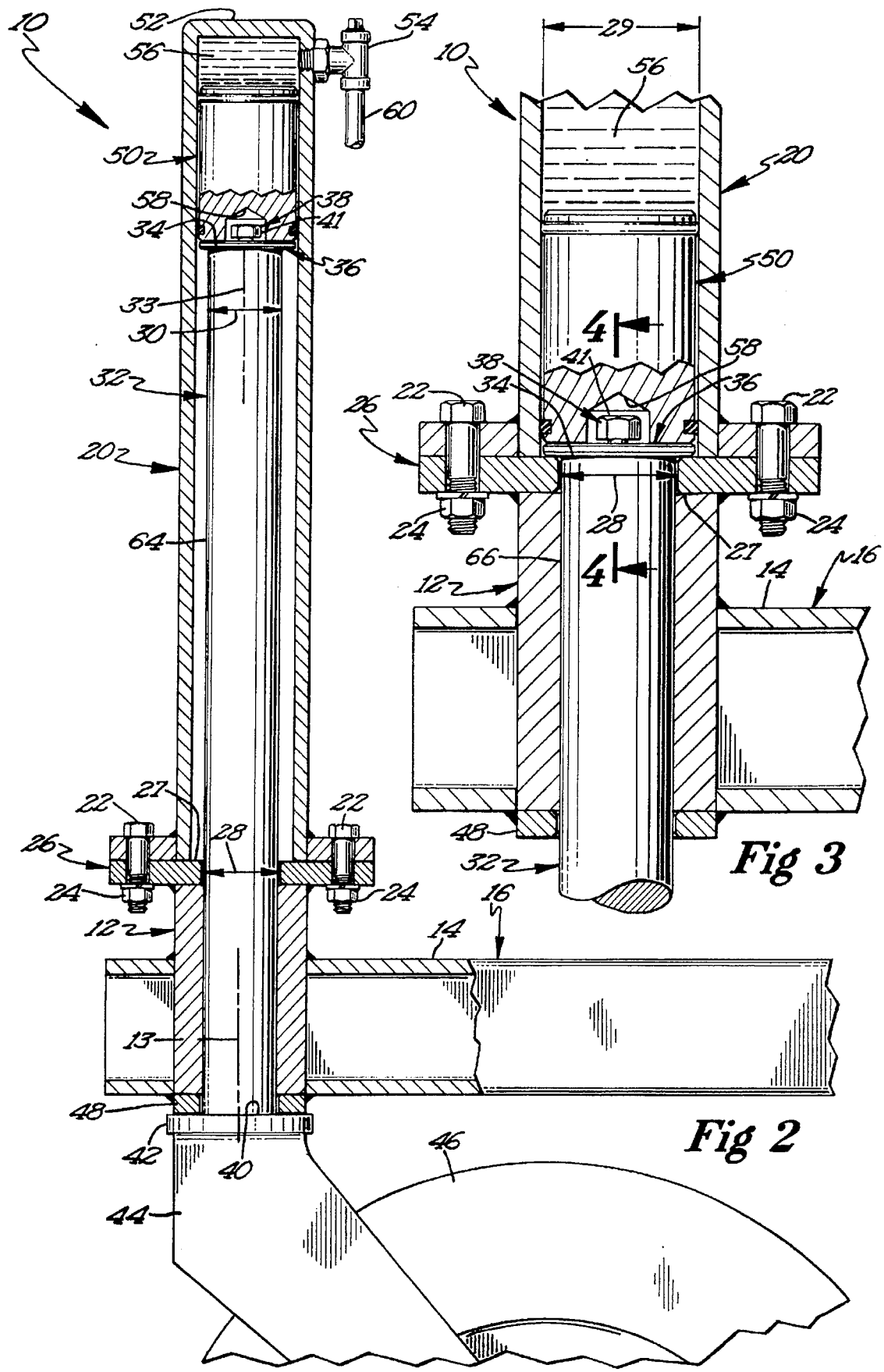
FIG. 2 is a side elevation view of an embodiment of the hydraulic lift apparatus, partially in section, and showing the lift apparatus in its normal, lowered operating position.
FIG. 3 is an enlarged view of the piston, shaft, and washer and cap screw shown in FIG. 2, but with the lift apparatus in its elevated position.

At its bottom 40, caster shaft 32 has a stop member 42 which bears against guide bushing 48 of sleeve 12 when the caster is in its normal operating position shown in FIG. 2. A wheel mounting 44 mounts caster wheel 46 to shaft 32. Caster shaft 32 and wheel 46 are freely rotatable. Caster shaft 32 is slidable in the sleeve 12 and cylinder 20 to move freely in response to movement of piston 50.

The guide bushing 48 is attached to sleeve 12 at its lower end. The bushing 48 serves as a guide to help keep caster shaft 32 in coaxial alignment with the sleeve 12 and the cylinder 20, as well as to engage stop member 42 of caster shaft 32 in order to limit upward motion of the caster shaft 32 into sleeve 12 and cylinder 20 once shaft 32 is fully seated within sleeve 12 and cylinder 20 in its retracted position 64. Dust seals may be provided between stop member 40 and bushing 48 to prevent dust entry within sleeve 12, but are not shown herein for reasons of simplification.

A cylinder piston 50 is situated within hydraulic cylinder 20 above the top 34 of caster shaft 32 and is free floating. At the top 52 of cylinder 20, and above the upper travel limit of the caster shaft 32 and the piston 50, a suitable hydraulic fluid inlet 54 is placed. Hydraulic fluid 56 is introduced through inlet 54 when it is desired to force the piston 50 and caster shaft 32 from their retracted position 64 to their extended position 66 to raise the frame 14 and carried tool to the elevated position. Piston 50 has at its lower end a recess 58 sized to fit over the cap screw 38 of caster shaft 32, in order to allow the force of piston 50 to be exerted evenly on washer 36.

A plurality of lift apparatuses 10 are attached to the frame 14 of a cultivator or air seeder 16 as shown in FIG. 1. The lift apparatuses 10 should be placed at intervals about the frame 14 of cultivator 16 to allow for even lifting and settling of the frame and any carried tool. When a plurality of lift apparatuses 10 are used on a cultivator or air seeder, hydraulic lines 60 are used to interconnect each lift apparatus 10 with the other lift apparatuses 10 so that the lifting operation will be smooth and even.

In operation, the lift apparatus 10 works as follows. In normal operation, blades 62 of the tool attached to frame 14 of cultivator 16 are in a first, operating position, during which the lift apparatus components are in their retracted position 64, and the blades 62 engage the ground, as shown in FIG. 2. The caster shaft 32 is retracted into sleeve 12 and cylinder 20 to its maximum extent, with stop member 42 abutting guide bushing 48. In this operating position, no lifting of the cultivator is taking place.

When it is desired to elevate the cultivator frame 14 and carried tool to a second, elevated position to remove the blades from ground contact for a turn-around in the field, or transport of the cultivator 16 on roads or to a storage area, the hydraulic cylinder 20 is actuated, and hydraulic fluid 56 is forced into the inlet 54 of cylinder 20, urging piston 50 downward into contact with washer 36, forcing caster shaft 32 downward from its first, retracted position 64 to a second extended position 66 in which the frame 14 is in its elevated position, the blades 62 are elevated above ground level, and washer 36 abuts inwardly extending shoulder 27 of flange 26 of sleeve 12, as best shown in FIGS. 1 and 3. This elevation of the blades 62 occurs uniformly across the frame 14, and may be accomplished while the cultivator is in motion. The motion from normal operating position to elevated position is unobstructed. Caster shaft 32 is freely slidable in the sleeve 12 and cylinder 20 in response to movement of the piston 50. There is no need for stopping to manually adjust any parts of the lift apparatus 10. When it is desired to allow the blades 62 to once again contact the ground, the pressure on the hydraulic fluid 56 in cylinder 20 is released, and the weight of the frame 14 the carried tool forces the fluid 56 from the cylinder 20, and the frame 14 lowers to its normal operating position. The hydraulic fluid 56 only need to be pumped in one direction, and the hydraulics only operate when the blades 62 need to be disengaged from the ground.

The detailed description outlined above is considered to be illustrative only of the principles of the invention. Numerous changes and modifications will occur to those skilled in the art, and there is no intention to restrict the scope of the invention to the detailed description. The preferred embodiment of the invention having been described in detail, the scope of the invention should be defined by the following claims.

What is claimed is:

1. A lift apparatus for a farm implement having a frame carrying a tool, to raise the frame relative to the ground, comprising:

an elongated sleeve having upper and lower ends and a longitudinal axis, said sleeve mountable to the frame, said axis being substantially upright;

a fluidically actuated cylinder having an inner surfaces a cylinder piston and a longitudinal axis, said cylinder mounted coaxially to said upper end of said sleeve so as to form a sleeve and cylinder combination;

a caster wheel having a shaft, said caster shaft being rotatably and freely, slidably received within said sleeve and cylinder combination for unobstructed sliding movement relative to said sleeve, between an operating position where said wheel is adjacent said sleeve lower end and the farm implement tool is carried below ground, and an elevated position wherein said wheel is spaced apart from said sleeve lower end and the farm implement tool is raised to clear the ground; and said cylinder piston positioned above said shaft, whereby when said cylinder is actuated, said cylinder piston pushes said caster shaft downwardly along said sleeve axis to raise the frame relative to the ground.

2. A lift apparatus as described in claim 1, and further comprising:

a guide bushing positioned within said sleeve adjacent said lower end, said bushing having a central aperture sized to snugly slidably fit said caster wheel shaft.

3. A lift apparatus as described in claim 2, and further comprising:

a stop member, on said caster shaft adjacent said caster wheel, which abuts said guide bushing when said caster shaft is fully within said sleeve and cylinder combination.

4. A lift apparatus as described in claim 1, and further comprising:

a washer and a cap screw fastened to the top of said shaft, and wherein:

said upper end of said sleeve includes a flange having an inwardly extending shoulder, said shoulder defining a stop which limits downward motion of said shaft by obstructing said washer when said cylinder is actuated.

5. A lift apparatus as described in claim 4, wherein said washer and said cap screw are separated by a gap, and said washer is free to rotate and move side to side to prevent scoring of the inner surfaces of said cylinder.

6. A lift apparatus as described in claim 1, wherein said caster wheel contacts said sleeve at said sleeve lower end.

7. A farm implement lift apparatus, comprising:

a farm implement having a frame and carrying a tool;

a plurality of sleeves each having a longitudinal axis and lower and upper ends, each said sleeve mounted to said frame with said axis substantially upright;

a plurality of fluidically actuated cylinders each having an inner surface, a cylinder piston, a longitudinal axis, and lower and upper ends, each said cylinder mounted coaxially with a said sleeve at said cylinder lower end to said sleeve upper end so as to form a plurality of sleeve and cylinder combinations;

a plurality of caster wheels each having a caster shaft mounted thereto, each caster shaft rotatably and freely slidably received within a said sleeve and cylinder combination for unobstructed sliding movement relative to said sleeve, between an operating position wherein said wheel is adjacent said sleeve lower end and said farm implement tool is carried below ground level, and an elevated position wherein said wheel is spaced apart from said sleeve lower end, and said farm implement tool is raised to clear the ground; and each said piston positioned above each said caster shaft, whereby when each said cylinder is actuated, each said cylinder piston pushes said respective caster wheel downwardly through said respective sleeve to elevate said frame relative to the ground.

8. A farm implement lift apparatus as described in claim 7, and further comprising:

a guide bushing positioned within each said sleeve adjacent said lower end, each said bushing having a central aperture sized to snugly fit said shaft.

9. A lift apparatus as described in claim 8, and further comprising:

a stop member, on each said caster shaft adjacent said caster wheel, which abuts said guide bushing when said caster shaft is fully within said sleeve and cylinder combination.

10. A lift apparatus as described in claim 7, and further comprising:

a washer and a cap screw fastened to the top of each said shaft, and wherein:

said upper end of each said sleeve includes a flange having an inwardly extending shoulder, said shoulder defining a stop which limits downward motion of said shaft by obstructing said washer when said cylinder is actuated.

11. A lift apparatus as described in claim 10, wherein said washer and said cap screw are separated by a gap, and said washer is free to rotate and move side to side to prevent scoring of the inner surfaces of said cylinder.

* * * * *